(12) United States Patent
Goudreau et al.

(10) Patent No.: US 8,132,266 B2
(45) Date of Patent: Mar. 6, 2012

(54) METHODS, SYSTEMS, AND COMPUTER PROGRAM PRODUCTS FOR IDENTIFYING AND ENFORCING SOFTWARE FEATURE LIMITS ACROSS DIFFERENT HARDWARE PLATFORMS, SOFTWARE RELEASES, AND TIERS

(75) Inventors: Robert F. Goudreau, Cary, NC (US); Eric R. Vook, Durham, NC (US); J. Brandon Myers, Cary, NC (US); Victor Kan, Morrisville, NC (US)

(73) Assignee: EMC Corporation, Hopkinton, MA (US)

( * ) Notice: Subject to any disclaimer, the term of this patent is extended or adjusted under 35 U.S.C. 154(b) by 1021 days.

(21) Appl. No.: 11/391,704

(22) Filed: Mar. 28, 2006

(65) Prior Publication Data

US 2007/0240233 A1    Oct. 11, 2007

(51) Int. Cl.
*G06F 17/30* (2006.01)
(52) U.S. Cl. ............................................. 726/31; 726/30
(58) Field of Classification Search .................. 380/200, 380/30; 713/192, 168, 182; 726/31, 24, 726/30; 709/12, 14; 705/59; 717/117, 168, 717/174, 122
See application file for complete search history.

(56) References Cited

U.S. PATENT DOCUMENTS

| | | | | |
|---|---|---|---|---|
| 6,434,535 | B1* | 8/2002 | Kupka et al. | ..................... 705/24 |
| 2002/0123992 | A1* | 9/2002 | Goldick | ........................... 707/4 |
| 2004/0054930 | A1* | 3/2004 | Walker et al. | ................. 713/202 |
| 2004/0163131 | A1 | 8/2004 | Benco | |
| 2006/0007944 | A1* | 1/2006 | Movassaghi et al. | .......... 370/401 |
| 2006/0178997 | A1* | 8/2006 | Schneck et al. | .................. 705/50 |
| 2006/0288422 | A1* | 12/2006 | Liu et al. | ........................... 726/26 |
| 2007/0050757 | A1* | 3/2007 | van Woerkom et al. | ....... 717/117 |
| 2007/0150418 | A1* | 6/2007 | Ben-Menahem et al. | ....... 705/59 |
| 2007/0168956 | A1* | 7/2007 | Moore et al. | ................... 717/120 |
| 2007/0174571 | A1* | 7/2007 | Elteto | ............................ 711/163 |

FOREIGN PATENT DOCUMENTS

EP    1 071 253 A1    1/2001
(Continued)

OTHER PUBLICATIONS

Notification of Transmittal of the International Search Report and the Written Opinion of the International Searching Authority, or the Declaration for International Application No. PCT/US2007/006118 (Oct. 4, 2007).

(Continued)

*Primary Examiner* — Vivek Srivastava
*Assistant Examiner* — Nega Woldemariam
(74) *Attorney, Agent, or Firm* — Jenkins, Wilson, Taylor & Hunt, P.A.

(57) ABSTRACT

Methods, systems, and computer program products for identifying and enforcing software feature limits across different hardware platforms, software releases, and tiers are disclosed. According to one method, a feature limit data structure is stored on the hardware platform. Each entry in the feature limit data structure is indexed by at least a software program identifier, a software release level identifier, and a feature name. When software is initialized, its release level is determined. A feature limit manager separate from the software being initialized is invoked. At least the software program identifier, the release level, and the feature identifier are provided as input to the feature limit manager. The feature limit manager provides a feature limit value. The feature limit value is stored and the software uses the feature limit value to enforce the feature limit during execution.

28 Claims, 4 Drawing Sheets

FOREIGN PATENT DOCUMENTS

WO  WO 2004/019182 A2  3/2004

OTHER PUBLICATIONS

"EMC CLARiiON CX700 Networked Storage System," EMC Corporation, pp. 1-2 (Oct. 2005).
"EMC CLARiion CX500 Networked Storage System," EMC Corporation, pp. 1-2 (Oct. 2005).
"AX-Series Software Overview," Revision A03, $EMC^2$, pp. 1-11 (Jul. 29, 2005).
"AX100-Series Technical Specifications," Revision A02, pp. 1-6 (Oct. 8, 2004).

* cited by examiner

METHODS, SYSTEMS, AND COMPUTER PROGRAM PRODUCTS FOR IDENTIFYING AND ENFORCING SOFTWARE FEATURE LIMITS ACROSS DIFFERENT HARDWARE PLATFORMS, SOFTWARE RELEASES, AND TIERS

TECHNICAL FIELD

The subject matter described herein relates to enforcing software feature limits. More particularly, the subject matter described herein relates to methods, systems, and computer program products for identifying and enforcing software feature limits across different hardware platforms, software releases, and tiers.

BACKGROUND ART

Feature limits are limits on the operational capabilities of software. Feature limits may be imposed because of limits of the underlying hardware, limits of the software, or for marketing reasons. For example, software developed for disk storage arrays may be used to copy information from one array to another array or between disks within the same array. The software may include a tier one version that allows 100 simultaneous disk copy sessions and a tier two version that allows only 50 simultaneous disk copy sessions. The developer may charge more for the tier one version to provide a customer with additional capabilities.

One method for enforcing software feature limits is to hard code the limits within the software programs. For example, the feature limit may be coded in a program as a constant. Different constants may be coded for different hardware platforms, software releases, and tiers to provide different capabilities for each combination. However, as the number of hardware platforms, software releases, and software tiers increases, hard-coded solutions unnecessarily increase the complexity of the software.

One solution for enforcing feature limits on different hardware platforms is to store a feature limit parameter in a registry present on the hardware platform and have the software read the parameter. One problem with this approach is that it does not allow different limits to be enforced based on different software tiers. In addition, if a limit is changed due to installation of a new software release. The new software may need to use the old feature limit parameter until the new software has been committed (explained below). Once the software has been committed, and there is no way to revert back to the old software, then the new limit can be used.

Still another problem associated with updating software feature limits occurs when it is desirable to upgrade directly from one release to a new release where there are intermediate releases between the existing release and the new release and where the intermediate releases and the new release have increased feature limits. For example, it may be desirable to upgrade from release 1 to release 3 where releases 2 and 3 have increased feature limits. When the system starts running release 3 code, it may be desirable to use release 1 feature limits until the release 3 software is committed. In a hard-coded solution, the release 3 software can only apply the release 3 feature limits.

Accordingly, in light of these difficulties associated with conventional methods for identifying and enforcing software feature limits, there exists a need for methods, systems, and computer program products for identifying and enforcing software feature limits across different hardware platforms, software releases, and tiers.

SUMMARY

Methods, systems, and computer program products for identifying and enforcing software feature limits are disclosed. According to one method, a feature limit data structure is stored on a hardware platform. When a program is initialized, its release level is determined. The program invokes a feature limit manager independent from the program with at least a feature identifier, a software release level, and a software program identifier as input to the feature limit manager. The feature limit manager accesses the feature limit data structure using the received program identifier, release level identifier, and feature identifier. The feature limit manager returns a limit for the software feature. The program stores and enforces the limit during execution of the program.

The subject matter described herein for identifying and enforcing software feature limits may be implemented using a computer program product comprising computer executable instructions embodied in a computer readable medium. Exemplary computer readable media suitable for implementing the subject matter described herein include chip memory devices, disk memory devices, programmable logic devices, application specific integrated circuits, and downloadable electrical signals. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
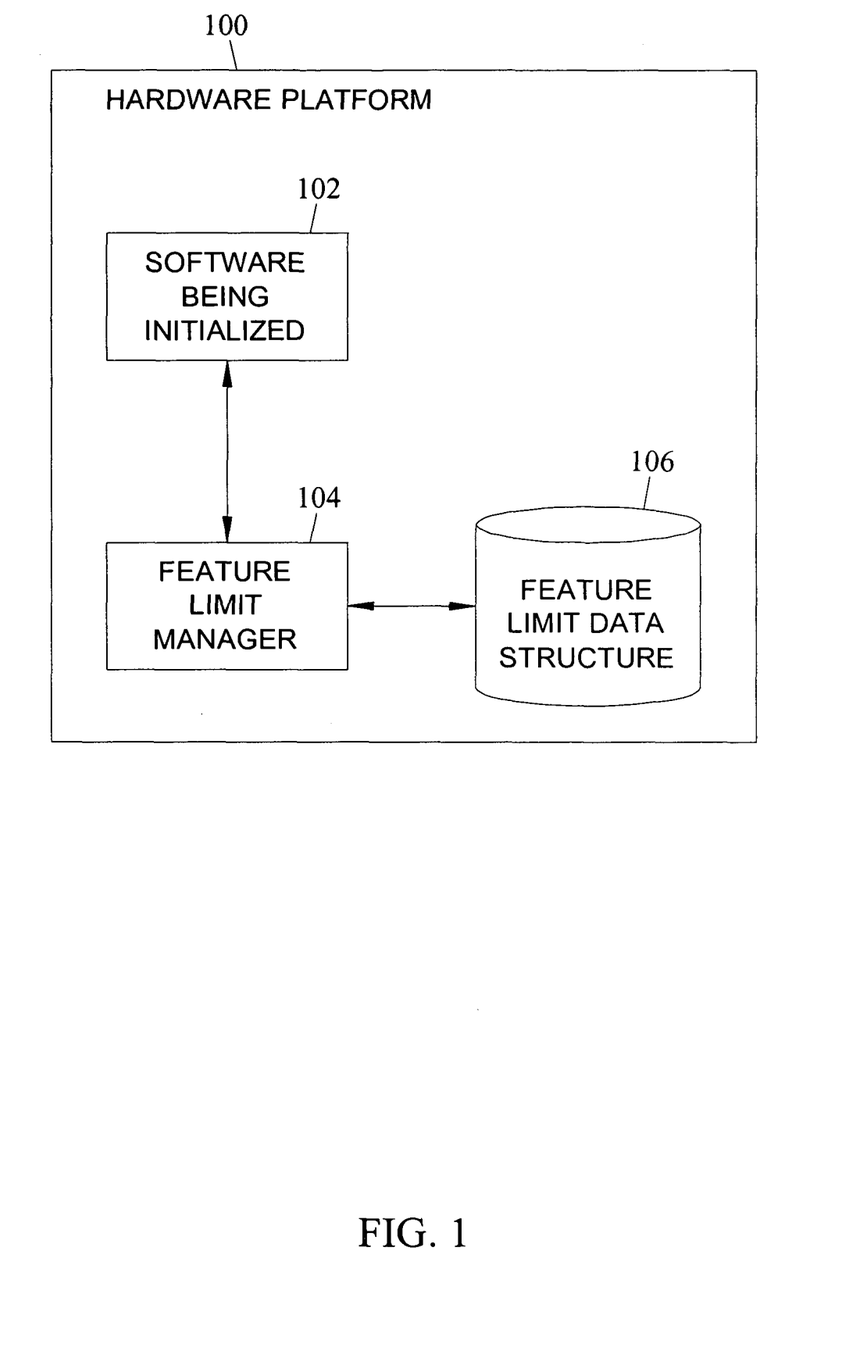
FIG. 1 is a block diagram illustrating a hardware platform including a system for identifying and enforcing software feature limits according to an embodiment of the subject matter described herein.

According to one aspect, the subject matter described herein includes a system that resides on a hardware platform for identifying and enforcing software feature limits. In FIG. 1, a hardware platform 100 may be any suitable hardware platform for executing different software releases and tiers. In one implementation, hardware platform 100 may be a disk array device that stores data on an array of disks. A commercially available example of hardware platform 100 is the CLARiiON® platform available from EMC Corporation of Hopkinton, Mass.

One problem associated with enforcing feature limits on a hardware platform such as the CLARiiON® platform is that different versions of the CLARiiON® platform may require different software feature limits. Examples of different versions of the CLARiiON® platform for which different software feature limits may be enforced include the CX500, the AX100, or the CX700. In addition to enforcing different software feature limits for different hardware platforms, it may be desirable to enforce different software feature limits based on software release level and software tier. As used herein, a software tier refers to a version of a program within the same release level that has different capabilities. For example, an application that copies data to remote disk storage array is referred to as SAN Copy. SAN Copy is available in two tiers—SAN Copy and SAN Copy Lite. SAN Copy and SAN Copy Lite may be available in the same software release level. However, SAN Copy may allow 100 simultaneous copy sessions to be open while SAN Copy Lite only allows 50. The system illustrated in FIG. 1 is designed to identify and enforce limits such as these.

In FIG. 1, the system includes software being initialized 102, a software feature limit manager 104, and a feature limit data structure 106. Software being initialized 102 may be any suitable software for executing on the hardware platform. For example, if the hardware platform is a disk array, the software being initialized may be a local or remote copy application that copies data between local or remote disks or any other suitable application that accesses data stored on the disk array. Feature limit manager 104 may be a module that is independent from software 102 and that is invoked by a function call from software 102 to determine software feature limits. By "independent from software program 102," it is meant that feature limit manager 104 may reside on hardware platform 100 independently from software program 102 and may be usable by multiple software programs being executed or installed on hardware platform 100 to determine their respective feature limits. In one implementation, feature limit manager 104 may be coded separately from software program 102 and may be stored in a utility library on hardware platform 100 to which each software program being installed links during installation. The utility library in which feature limit manager 104 resides may be a static library such that each program being installed is linked with a separate copy of the executable code of feature limit manager 104. In alternate implementation, feature limit manager 104 may be a dynamic link library such that a single instance of feature limit manager 104 exists on hardware platform 100 and is callable by multiple programs being executed or installed.

The function call used to invoke feature limit manager 104 may specify the name of the program for which the feature limit is sought, the software release level, the software tier name, and the feature name. The software release level, the software tier name, the feature name and/or any other parameters may be provided as a single combined parameter in the function call or as separate parameters without departing from the scope of the subject matter described herein. For example, in one implementation, the function call may include a pointer to a structure that contains all of the parameters. In an alternate implementation, the software release level, the software tier name, the feature name, and/or other index data may be provided as separate parameters to the feature limit manager function call.

Feature limit manager 104 may use these parameters to access feature limit data structure 106 and obtain the appropriate feature limit value to the application. Feature limit data structure 106 may include entries storing feature limits for a plurality of different features. Each entry may be indexed by at least the program name, software release level, and feature name. A common feature limit data structure including feature limits for different hardware platforms may be stored on a group of different hardware platforms. As such, each entry in feature limit data structure 106 may also be indexed based on a hardware platform identifier. In addition, to provide support for enforcing different feature limits by based on software tiers, at least some entries in feature limit data structure 106 may be indexed by software tier names. In an alternate embodiment, feature limit manager 106 may be specific to a hardware platform. In such an implementation, the hardware platform identifier could be omitted as an index parameter in data structure 106

In one optimization of the subject matter described herein, a feature limit data structure specific to a hardware platform may be copied into the registry of the hardware platform at the time a software package is installed on the hardware platform. The feature limit data structure may contain feature limits that are specific to the hardware platform. Each time the feature limit manager is called when new releases are installed, it is not necessary to provide the hardware platform identifier as an input parameter, because the table stored in the registry is specific to the hardware platform on which it is installed. Copying a hardware-specific table at package install time reduces the storage requirements and lookup time over an implementation where a non-hardware-specific data structure is used for all feature limits.

Figure 2:
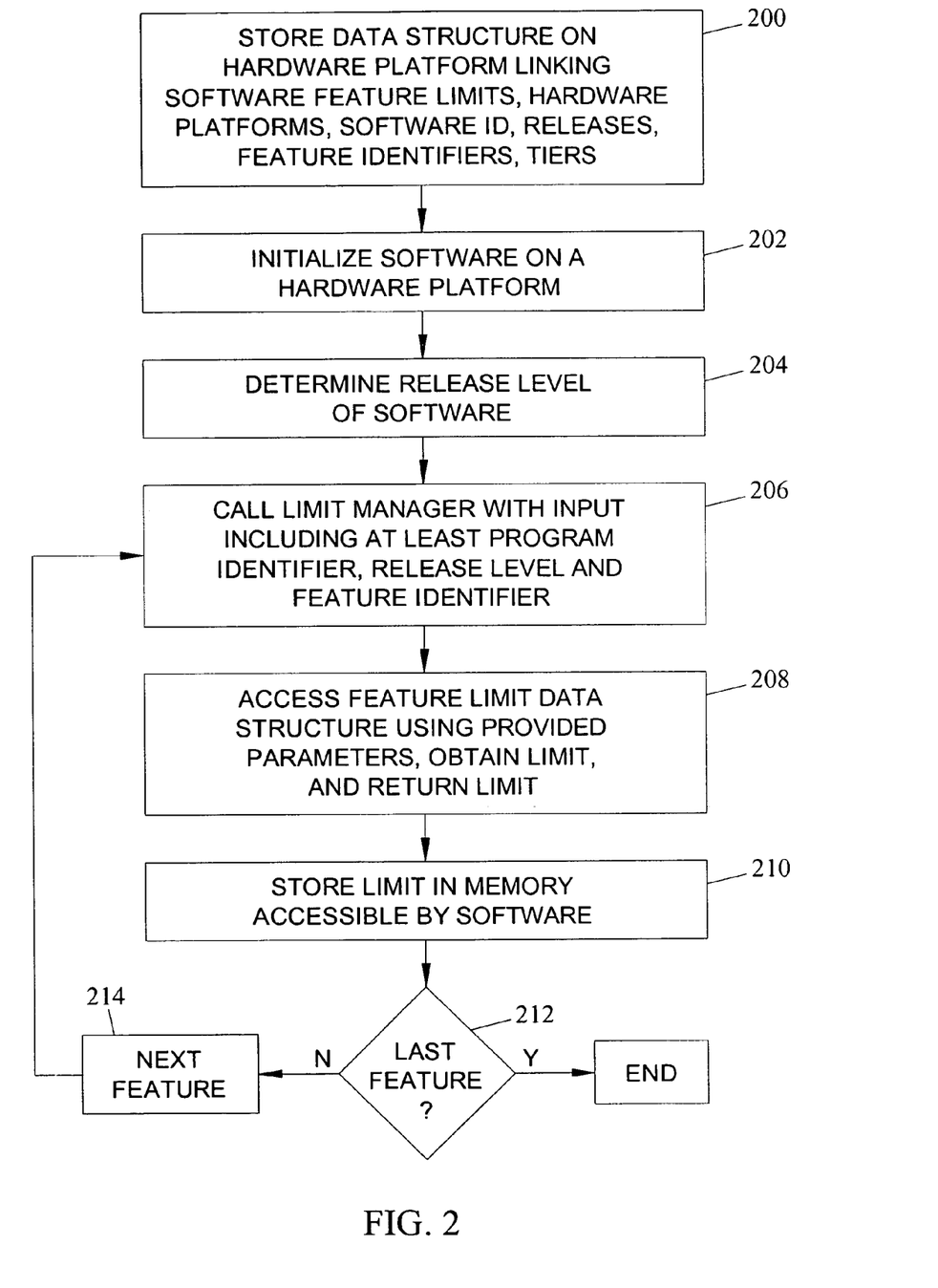
FIG. 2 is a flow chart illustrating exemplary steps for identifying software feature limits for different combinations of hardware platforms, software releases, and software tiers according to an embodiment of the subject matter described herein.

FIG. 2 is a flow chart illustrating exemplary steps for identifying software feature limits across different software release levels, software tiers, and hardware platforms according to an embodiment of the subject matter described herein. Referring to FIG. 2, in step 200, a data structure is stored on a hardware platform that links software feature limits to hardware platforms, program identifiers, software release levels, feature identifiers, and software tiers. Step 200 may be performed at a production facility when a hardware platform is created. Alternatively, step 200 may be performed when an operating system is loaded onto hardware platform 100. In yet another alternative, the feature limit data structure may be stored at the time that software requiring feature limits is loaded onto hardware platform 100. In step 202, software is initialized on the hardware platform. Initializing software may include initializing software for which no prior version is present on the hardware platform or initializing a version for which a prior version is present on the hardware platform.

In step 204, a release level of the software is determined. As will be described in detail below, in some implementations, a separate commit operation is required to commit to the current release level. In such an implementation, if the current release level has been committed to, that release level, which is referred to as the commit level, is used to determine feature limits to be applied to the software. In implementations where a separate commit operation is not required, the release level of the software being installed may be used to determine the appropriate feature limits. An example where a commit operation is performed to commit to the current release level will be described in detail below.

In step 206, the software being initialized calls the feature limit manager with input that includes at least the program identifier, the software release level, and the feature identifier. The software tier name and the hardware platform may be provided as optional parameters with multiple tiers and/or multiple hardware platforms are present in the same feature limit data structure.

The following is a specification of a function call that may be used to invoke a limit manager and obtain a feature limit according to an embodiment of the subject matter described herein:

K10MiscUtilRegistryQueryFeatureLimit

This function returns the value of a given version of a feature limit from the Registry.

```
NTSTATUS
    K10MiscUtilRegistryQueryFeatureLimit(
        IN PCHAR ProdName,
        IN PCHAR TierName,
        IN OUT PULONG pLevel,
        IN PCHAR ParamName,
        OUT PVOID pParamVal,
        IN OUT PULONG pLength
    );
```

Parameters

ParamName

The name of the product for which a feature limit parameter value is being requested.

TierName

The name of the package tier for which the feature limit parameter value is being requested. Use "Default" for packages that have no tiers.

pLevel

On input, contains the Compatibility Level of the feature limit parameter whose value is being requested. On output, contains the highest-numbered level that was actually found in the table but which does not exceed the input level.

ParamName

The name of the feature limit parameter whose value is being requested.

pParamVal

Pointer to a caller-allocated buffer in which the parameter value retrieved from the Registry will be stored.

pLength

On input, points to the size in bytes of the pParamVal buffer.

On output, points to the number of bytes in that buffer that were actually used to store the requested value.

Return Value

STATUS_SUCCESS: The value was retrieved successfully.

STATUS_OBJECT_NAME_NOT_FOUND: The specified parameter was not found in the Registry.

STATUS_BUFFER_TOO_SMALL: The caller-supplied buffer was not large enough to hold the value of the specified parameter.

In response to the function call, in step 208 the limit manager accesses the feature limit data structure using the specified parameters, obtains the feature limit, and stores the feature limit in a memory location accessible by the calling application. In the exemplary function call above, the feature limit is stored in the memory location pointed to by the pParamVal pointer. In step 210, the software stores the limit in memory that it can access. In step 212, the software determines whether this is the last feature for which a feature limit is needed. If this is the last feature, the process of obtaining feature limits ends. If this is not the last feature, control returns to step 206 where the feature limit manager is called to obtain a limit for the next feature.

In the example function call above and in FIG. 2, the feature identifier is passed as a parameter to the function call. Passing the feature identifier as a parameter to the function call and using the feature identifier to access the feature limit data structure reduces the need for complex data structures to be maintained for each combination of hardware platform, software program, and features. For example, if the feature identifier were omitted from the function call, it would be necessary to store a set of parameters and corresponding features for each combination of hardware platform, program identifier, and release level. By including the feature identifier in the function call, the calling program can separately access the feature limit data structure to obtain the limit for each feature. Even though multiple function calls may be required to obtain multiple feature limits, the computational expense of multiple function calls is offset by the reduction and complexity in the feature limit data structure.

Figure 3:
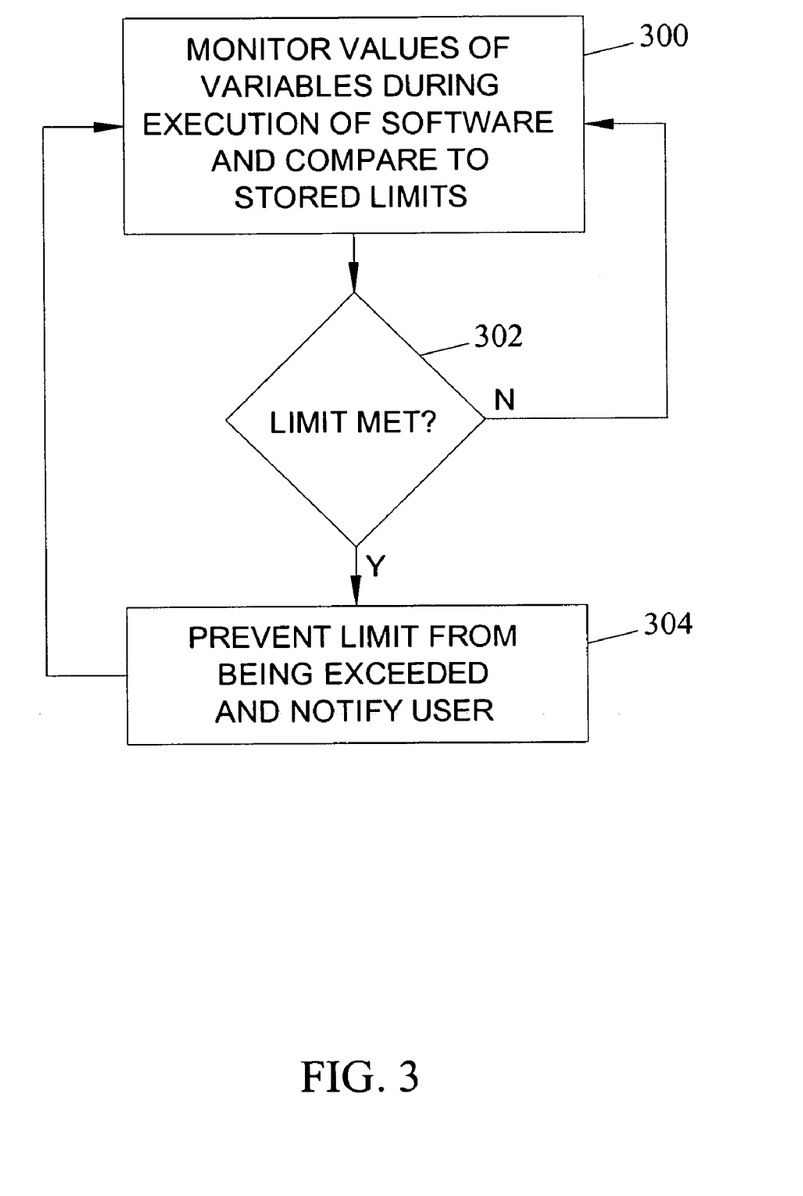
FIG. 3 is a flow chart illustrating exemplary steps for enforcing a software feature limit according to an embodiment of the subject matter described herein.

FIG. 3 is a flow chart illustrating exemplary steps that may be performed the software in enforcing the feature limit. Referring to FIG. 3, in step 300, the newly initialized software monitors values of variables during execution of the software and compares the values to the stored feature limits. In step 302, the software determines whether a feature limit has been met. If a feature limit has been met, control proceeds to step 304 where the software prevents the feature limit from being exceeded and optionally notifies the user. For example, the feature limit may be the number of simultaneous copy sessions that are allowed for a disk copy application. If the simultaneous copy session limit is met, the copy application may notify the user that no additional copy can be started but that the user can purchase an increased functionality tier of the software to allow additional simultaneous copy sessions.

As stated above, a software feature limit manager and data structure may allow different feature limits to be identified and enforced for different hardware platforms, different software release levels, and tiers. Table 1 shown below illustrates exemplary entries that may be present in feature limit data structure 106 for two tiers and two different release levels of the above-described SAN Copy program.

TABLE 1

Exemplary Feature Limits Data Structure

| Hardware Platform | Program ID | Release Level | Tier | num_sessions |
|---|---|---|---|---|
| CX500 | SAN Copy | 1.0 | Default | 100 |
| CX500 | SAN Copy | 1.0 | Lite | 50 |
| CX500 | SAN Copy | 2.0 | Default | 150 |
| CX500 | SAN Copy | 2.0 | Lite | 75 |
| CX700 | SAN Copy | 1.0 | Default | 200 |
| CX700 | SAN Copy | 1.0 | Lite | 100 |
| CX700 | SAN Copy | 2.0 | Default | 300 |
| CX700 | SAN Copy | 2.0 | Lite | 150 |

In Table 1, the first column represents different hardware platforms. In the illustrated example, the hardware platforms are different versions of the above-mentioned CLARiiON® platform. The program identifier in the second column specifies the SAN Copy program that copies data form a local storage array to a remote storage array. The third column specifies the software release level. The fourth column specifies the software tier. In the illustrated example, the tiers are "default" for the default or full functionality version of SAN Copy and "Lite" for the reduced functionality version of SAN Copy. The fifth column specifies a single feature, referred to as num_sessions, indicates the number of simultaneous copy sessions that are allowed. As can be seen, the number of simultaneous copy sessions that are allowed for the default version is twice that allowed for the Lite version and varies across different hardware platforms. In addition, the number of simultaneous copy sessions for release level 2.0 is twice that allowed for release level 1.0. Additional columns may be provided in a feature limit data structure for different features provided by the SAN Copy or other program. Providing a data structure and an associated limit manager that allow such limits to be easily identified for different software release levels and tiers and across different hardware platforms simplifies software design and allows easy modification of feature limits. For example, feature limits can be modified by altering the feature limit data structure when new software releases or tiers are loaded onto hardware platforms.

As stated above, the subject matter described herein may be used to determine feature limits when the separate step of committing to a current level of software being installed is required. A commit operation is a one-way operation that allows the current release level to be committed to for feature limits purposes. Once a commit operation is performed, the prior software may be incompatible with the current feature limits. For example, if a user is running release level 3 of SAN Copy, which allows 50 simultaneous disk copy sessions, and the user installs release level 4, which allows 100 simultaneous disk copy sessions, once the user commits to release level 4, the user cannot run release level 3 because the feature limits for release level 4 are incompatible with those of release level 3.

In one exemplary implementation, during installation, the software being installed may call the feature limit manager twice—once to obtain the feature limits for the current release level to which the administrator has committed and again to obtain the feature limits for the release level being installed. Both sets of feature limits may be stored in memory accessible by the software. Accordingly, if the administrator later commits to the new software release, the software may dynamically start using the feature limits for the new release level.

Figure 4:
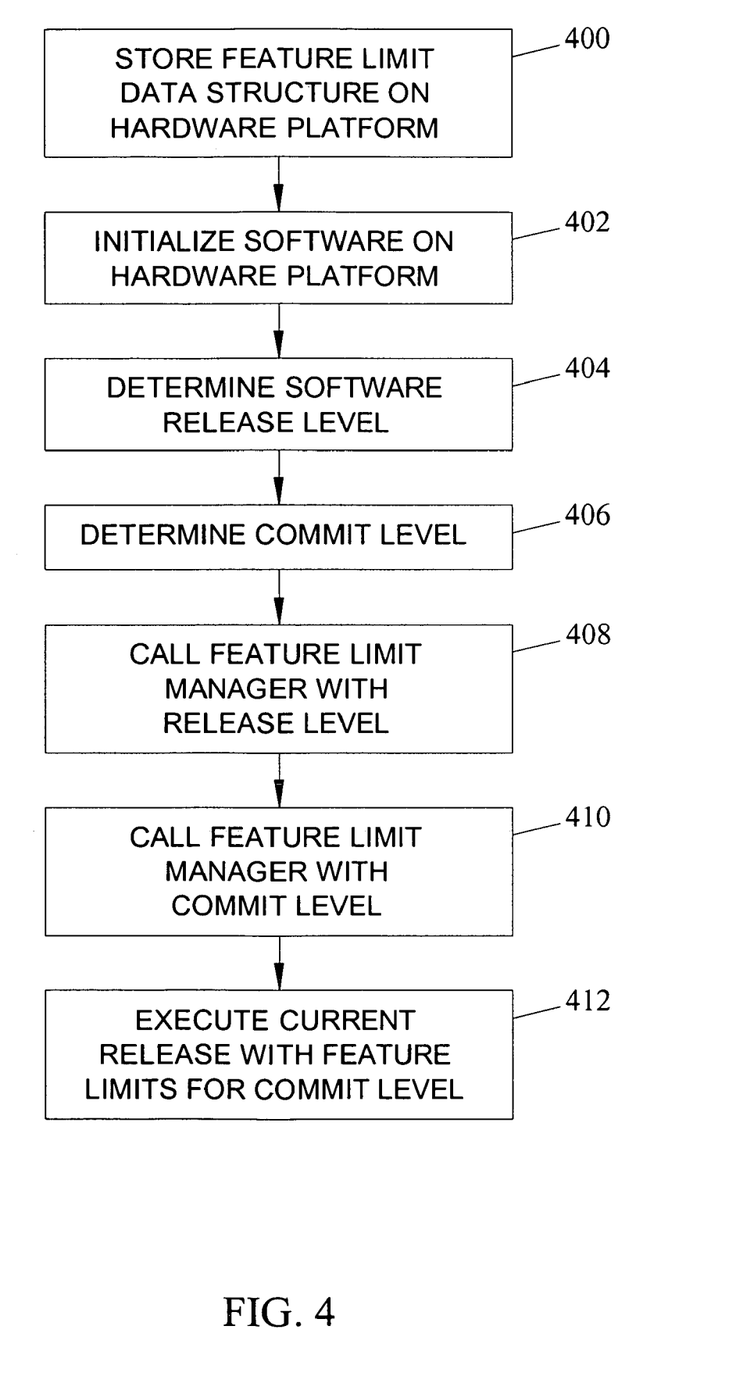
FIG. 4 is a flow chart illustrating exemplary steps for identifying software feature limits for different combinations of hardware platforms, software releases, software commit levels, and software tiers according to an embodiment of the subject matter described herein.

FIG. 4 is a flow chart illustrating exemplary steps for identifying software feature limits across different software release levels, software commit levels, software tiers, and hardware platforms according to an embodiment of the subject matter described herein. Referring to FIG. 4, in step 400, the feature limit data structure is stored on a hardware platform. In step 402, software is initialized on the hardware platform. Initializing software may include initializing software for which no prior version is present on the hardware platform or initializing a version for which a prior version is present on the hardware platform.

In step 404, a release level of the software is determined. In step 406, the commit level is determined. As stated above, the commit level is the level associated with the software release to which the user has committed. The commit level may be the current release level for the software being installed if the user has committed to the current release level. Alternatively, the commit level may be the level corresponding to a previous release level to which the user or operator has committed. The commit level may be stored in persistent storage associated with a hardware platform.

In step 408, the feature limit manager is called with the release level of the software being installed to obtain a feature limit for a particular feature. As described above with regard to FIG. 2, additional parameters, such as the feature identifier and the hardware platform identifier may be supplied in the call. In step 410, the feature limit manager is called with the commit level to obtain a feature limit for a particular feature and the corresponding commit level. Calling the feature limit manager twice allows limits to be stored for both the release level and the commit level if the levels are different. In step 412, the current release is executed with feature limits that correspond to the commit level. Thus, using the steps illustrated in FIG. 4, a user may determine a feature limit to be applied for a software commit level in implementations where a commit operation is required for software to execute with full capabilities.

As stated above in the background section, it may be desirable to upgrade from one release level to a new release level where there are intermediate releases and where the intermediate and new release levels have increased feature limits. In such an implementation, the feature limit data structure may store feature limits for the current release and all previous releases. If it is desirable to upgrade from release 1 to release 3 where both releases 2 and 3 have increased feature limits, storing feature limits for all prior releases in the feature limit data structure allows the release 3 code to begin execution using release 1 feature limits. The table also allows the software to switch to release 3 feature limits when the release 3 software is committed.

It will be understood that various details of the invention may be changed without departing from the scope of the invention. Furthermore, the foregoing description is for the purpose of illustration only, and not for the purpose of limitation.

What is claimed is:

1. A method for identifying and enforcing a software feature limit, the method comprising:
   (a) storing a data structure on a hardware platform, the data structure including a plurality of feature limits for a plurality of software features, each feature limit being indexed by at least a software program identifier, a software release level identifier, and a feature identifier;
   (b) initializing software on the hardware platform;
   (c) determining a release level of the software, wherein the release level identifies a software version having a set of operational capabilities;
   (d) determining a commit level, wherein the commit level identifies a software release level for determining feature limits to be enforced on the set of operational capabilities, wherein the commit level is determined by the software version that is committed to the hardware platform;
   (e) invoking a feature limit manager independent from the software and providing at least a software program identifier, a commit level identifier, and a feature identifier as input to the feature limit manager, wherein the feature limit manager uses the input to query the data structure for a feature limit;
   (f) receiving the feature limit from the feature limit manager corresponding to the commit level and based on the input; and
   (g) enforcing the feature limit during execution of the software corresponding to the commit level, wherein enforcing the feature limit includes monitoring a value of a variable associated with the feature limit during execution of the software, determining whether the feature limit has been met, and in response to determining that feature limit has been met, preventing the feature limit from being exceeded.

2. The method of claim 1 wherein the hardware platform comprises a disk array.

3. The method of claim 1 comprising repeating steps (d)-(f) for each feature of a plurality of features provided by the software.

4. The method of claim 1 wherein the release level is equal to x, x being an integer, wherein the commit level is any integer y less than x, wherein executing the software using feature limits corresponding to the commit level includes executing the software using feature limits corresponding to release level y, and in response to committing the software being initialized, switching to feature limits corresponding to release level x.

5. The method of claim 1 comprising repeating steps (d)-(f) for each feature of a plurality of features provided by the software.

6. A system for identifying and enforcing software feature limits, the system comprising:
(a) a computer storing a feature limit data structure for storing limits for a plurality of different software features corresponding to a commit level, each entry in the data structure being indexed by at least a software program identifier, a software release level, and a feature identifier, wherein the software release level identifies a software version having a set of operational capabilities;
(b) a feature limit manager for receiving as input at least a program identifier, a commit level identifier, and a feature identifier, for using the input to query the data structure for a feature limit, and for accessing the feature limit data structure to obtain feature limits corresponding to the commit level to be enforced by software being initialized on a hardware platform, wherein the commit level identifies a software release level for determining feature limits to be enforced on the set of operational capabilities, wherein the commit level is determined by the software version that is committed to the hardware platform; and
(c) a software program independent from the feature limit manager for invoking the feature limit manager, for providing the feature limit manager with the at least a program identifier, a commit level identifier, and a feature identifier as input, for receiving a corresponding feature limit from the feature limit manager, and for enforcing the feature limit corresponding to the commit level, wherein enforcing the feature limit includes monitoring a value of a variable associated with the feature limit during execution of the software, determining whether the feature limit has been met, and in response to determining that feature limit has been met, preventing the feature limit from being exceeded.

7. The system of claim 6 wherein the software program comprises a copy application for copying data from one location to another location in a disk array.

8. A computer program product comprising computer executable instructions embodied in a non-transitory computer readable medium for performing steps comprising:
(a) storing a data structure on a hardware platform, the data structure including a plurality of feature limits for a plurality of software features, each feature limit being indexed by at least a software program identifier, a software release level identifier and a feature identifier;
(b) initializing software on the hardware platform;
(c) determining a release level of the software, wherein the release level identifies a software version having a set of operational capabilities;
(d) determining a commit level, wherein the commit level identifies a software release level for determining feature limits to be enforced on the set of operational capabilities, wherein the commit level is determined by the software version that is committed to the hardware platform;
(e) invoking a feature limit manager independent from the software and providing at least a software program identifier, a commit level identifier, and a feature identifier as input to the feature limit manager, wherein the feature limit manager uses the input to query the data structure for a feature limit;
(f) receiving the feature limit from the feature limit manager corresponding to the commit level and based on the input; and
(g) enforcing the feature limit during execution of the software corresponding to the commit level, wherein enforcing the feature limit includes monitoring a value of a variable associated with the feature limit during execution of the software, determining whether the feature limit has been met, and in response to determining that feature limit has been met, preventing the feature limit from being exceeded.

9. A method for identifying a feature limit associated with software being initialized on a hardware platform, the method comprising:
(a) storing, on a hardware platform, a feature limit data structure having a plurality of entries specifying feature limits for software features, each entry being indexed by at least a software program identifier, a software release level, and a feature identifier, wherein the software release level identifies a software version having a set of operational capabilities;
(b) determining a commit level for software being initialized on a hardware platform, wherein the commit level identifies a software release level for determining feature limits to be enforced on the set of operational capabilities, wherein the commit level is determined by the software version that is committed to the hardware platform;
(c) receiving, from software being initialized on the hardware platform, a call requesting a value for a feature limit, the call including at least a software program identifier, the commit level, and a feature identifier as input;
(d) accessing the feature limit data structure, locating an entry corresponding to the software program identifier, the commit level, and the feature identifier; and
(e) providing the feature limit to the software being initialized, wherein the software being initialized enforces the feature limit, where enforcing the feature limit includes monitoring a value of a variable associated with the feature limit during execution of the software, determining whether the feature limit has been met, and in response to determining that feature limit has been met, preventing the feature limit from being exceeded.

10. The method of claim 9 wherein storing a data structure on a hardware platform includes storing a data structure having entries indexed by a plurality of different hardware platform identifiers, software program identifiers, software release level identifiers, and feature identifiers.

11. The method of claim 9 wherein storing a feature limit data structure on a hardware platform includes storing a data structure that is specific to the hardware platform having entries indexed by software program identifiers, software release level identifiers, and feature identifiers.

12. The method of claim 9 wherein storing a feature limit data structure on a hardware platform includes storing the data structure on a disk array.

13. The method of claim 9 wherein at least some of the entries in the feature limit data structure are indexed by software tier identifiers and wherein accessing a feature limit data structure includes accessing the feature limit data structure using the software tier identifiers, wherein each software tier identifier is usable to distinguish between versions of software of the same release level with different capabilities.

14. The method of claim 9 wherein steps (b) and (c) are performed in response to initialization of the software.

15. A method for identifying and enforcing software feature limits based on a commit level, the method comprising:
(a) storing a feature limit data structure on a hardware platform, the feature limit data structure including a plurality of feature limits for a plurality of software features, each feature limit being indexed by at least a software program identifier, a software release level identifier, and a feature identifier;
(b) initializing software on the hardware platform;
(c) determining a release level of the software, wherein the release level identifies a software version having a set of operational capabilities;
(d) determining a commit level, wherein the commit level identifies a software release level for determining feature limits to be enforced on the set of operational capabilities, wherein the commit level is determined by the software version that is committed to the hardware platform;
(e) obtaining, from the feature limit data structure, feature limits corresponding to the commit level and based on at least a software program identifier, the commit level, and a feature identifier; and
(f) executing the software using the feature limits corresponding to the commit level, wherein enforcing the feature limit includes monitoring a value of a variable associated with the feature limit during execution of the software, determining whether the feature limit has been met, and in response to determining that feature limit has been met, preventing the feature limit from being exceeded.

16. The method of claim 15 wherein the commit level is different from the release level.

17. The method of claim 15 wherein the commit level is the same as the release level.

18. The method of claim 15 wherein the release level is equal to x, x being an integer, wherein the commit level is any integer y less than x, wherein executing the software using feature limits corresponding to the commit level includes executing the software using feature limits corresponding to release level y, and in response to committing the software being initialized, switching to feature limits corresponding to release level x.

19. A system for identifying and enforcing software feature limits, the system comprising:
(a) a computer storing a feature limit data structure for storing limits for a plurality of different software features, each entry in the data structure being indexed by at least a software program identifier, a software release level, and a feature identifier;
(b) a feature limit manager for accessing the feature limit data structure to obtain feature limits to be enforced by software being initialized on a hardware platform; and
(c) a software program independent from the feature limit manager for invoking the feature limit manager, for providing the feature limit manager with at least a program identifier, a software release level identifier, and a feature identifier as input, for receiving a corresponding feature limit from the feature limit manager based on the input, and for enforcing the feature limit, wherein enforcing the feature limit includes monitoring a value of a variable associated with the feature limit during execution of the software, determining whether the feature limit has been met, and in response to determining that feature limit has been met, preventing the feature limit from being exceeded, wherein the software release level identifier identifies a software version having a set of operational capabilities, wherein the software release level identifier comprises a commit level, wherein the commit level identifies a software release level for determining feature limits to be enforced on the set of operational capabilities, wherein the commit level is determined by the software version that is committed to the hardware platform.

20. The system of claim 19 wherein the feature limit data structure includes entries indexed by a combination of hardware platform identifier, program identifier, software release level identifier, and feature identifier.

21. The system of claim 19 wherein the feature limit data structure is specific to a hardware platform and includes entries indexed by software program identifier, software release level identifier, and feature identifier.

22. The system of claim 19 wherein the feature limit data structure includes at least some entries indexed by a software tier identifier, wherein the feature limit manager is adapted to provide the software tier identifier as input when requesting a limit for a given feature and wherein the tier identifier is usable to distinguish being software of the same release level with different capabilities.

23. The system of claim 19 wherein the software program comprises a copy application for copying data from one location to another location in a disk array.

24. The system of claim 19 wherein the software program is adapted to call the feature limit manager with different input to obtain limits for different features.

25. A universal system for identifying and enforcing software version feature limits across different hardware platforms, software releases, and tiers, the system comprising:
(a) a computer storing a feature limit data structure including entries containing feature limits for software operational parameters, each entry in the data structure being indexed by at least a hardware platform identifier, a software program identifier, a software release level identifier, and a feature identifier; and
(b) a feature limit manager being callable by a plurality of different applications for obtaining software feature limits for different release levels of the applications from the feature limit data structure, wherein an application of the plurality of different applications is adapted to provide to the feature limit manager at least a software program identifier, a software release level identifier, and a feature identifier as input and wherein the feature limit manager is adapted to provide, based on the input, a corresponding feature limit to the application, wherein the application enforces the feature limit, wherein enforcing the feature limit includes monitoring a value of a variable associated with the feature limit during execution of the software, determining whether the feature limit has been met, and in response to determining that feature limit has been met, preventing the feature limit from being exceeded, wherein the software release level identifier identifies a software version having a set of operational capabilities, wherein the software release level identifier comprises a commit level, wherein the commit level identifies a software release level for determining feature limits to be enforced on the set of operational capabilities, wherein the commit level is determined by the software version that is committed to the hardware platform.

26. The system of claim 25 wherein the feature limit data structure includes at least some entries that are indexed by software tier identifiers and wherein the limit manager is adapted to use a software tier identifier to access the feature limit data structure and obtain a feature limit corresponding to the software tier identifier and wherein each tier identifier is usable to distinguish between programs with different capabilities that are of the same software release level.

27. A computer program product comprising computer executable instructions embodied in a non-transitory computer readable medium for performing steps comprising:
   (a) storing a data structure on a hardware platform, the data structure including a plurality of feature limits for a plurality of software features, each feature limit being indexed by at least a software program identifier, a software release level identifier and a feature identifier;
   (b) initializing software on the hardware platform;
   (c) determining a release level of the software, wherein the release level identifies a software version having a set of operational capabilities;
   (d) determining a commit level, wherein the commit level identifies a software release level for determining feature limits to be enforced on the set of operational capabilities, wherein the commit level is determined by the software version that is committed to the hardware platform;
   (e) obtaining feature limits corresponding to the commit level;
   (f) invoking a feature limit manager independent from the software and providing at least a software program identifier, a software release level identifier, and a feature identifier as input to the feature limit manager, wherein the feature limit manager uses the input to query the data structure for a feature limit;
   (g) receiving a feature limit from the feature limit manager based on the input; and
   (h) enforcing the feature limit during execution of the software, wherein enforcing the feature limit includes monitoring a value of a variable associated with the feature limit during execution of the software, determining whether the feature limit has been met, and in response to determining that feature limit has been met, preventing the feature limit from being exceeded.

28. A computer program product comprising computer executable instructions embodied in a non-transitory computer readable medium for performing steps comprising:
   (a) storing, on a hardware platform, a feature limit data structure having a plurality of entries specifying feature limits for software features, each entry being indexed by at least a software program identifier, a software release level identifier, and a feature identifier;
   (b) receiving, from software being initialized on the hardware platform, a call requesting a value for a feature limit, the call including at least a software program identifier, a software release level identifier, and a feature identifier as input, wherein the software release level identifier identifies a software version having a set of operational capabilities, wherein the software release level identifier comprises a commit level, wherein the commit level identifies a software release level for determining feature limits to be enforced on the set of operational capabilities, wherein the commit level is determined by the software version that is committed to the hardware platform;
   (c) accessing the feature limit data structure and locating an entry corresponding to the software program identifier, release level identifier, and the feature identifier; and
   (d) providing the feature limit to the software being initialized, wherein the software being initialized enforces the feature limit, wherein enforcing the feature limit includes monitoring a value of a variable associated with the feature limit during execution of the software, determining whether the feature limit has been met, and in response to determining that feature limit has been met, preventing the feature limit from being exceeded.

* * * * *